W. M. ELLIS AND E. E. SHERMAN.
PISTON ROD JOURNAL BEARING.
APPLICATION FILED JULY 12, 1919.
1,347,687.
Patented July 27, 1920.
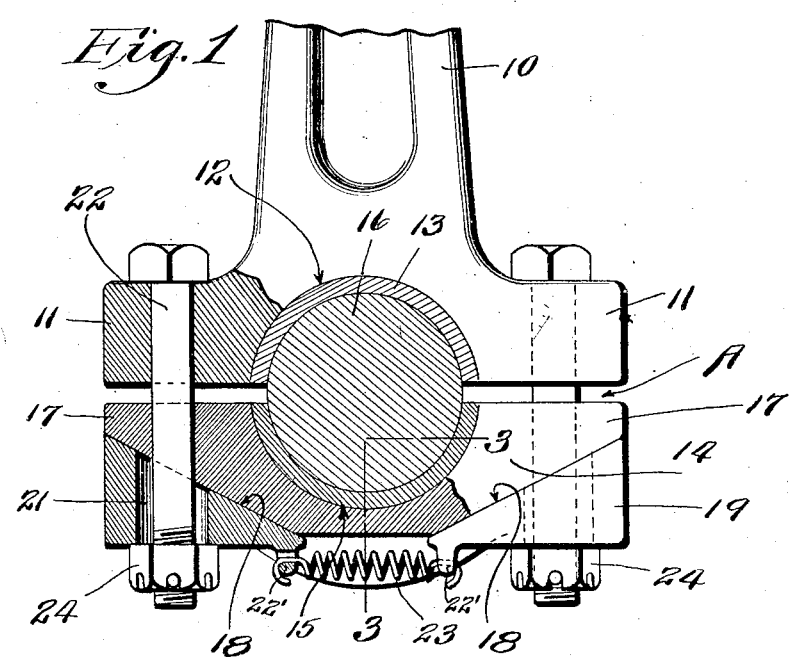
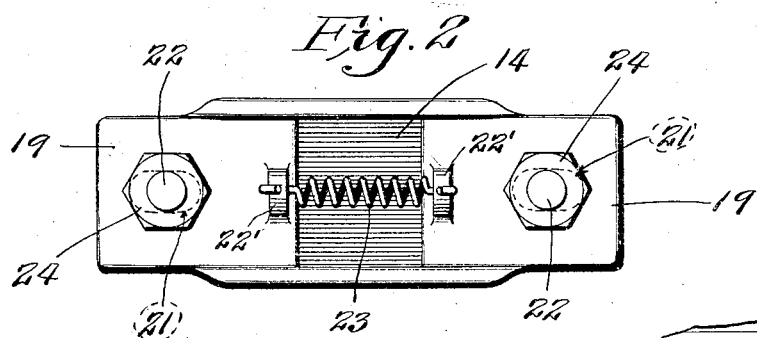
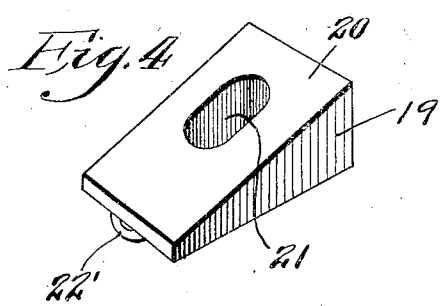
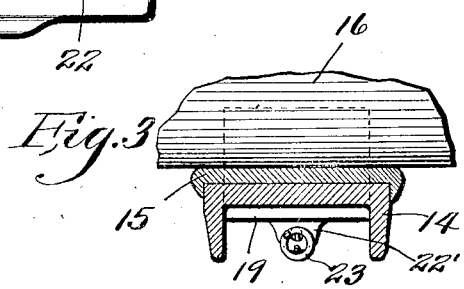
Inventors
William M. Ellis
Elmer E. Sherman

UNITED STATES PATENT OFFICE.

WILLIAM M. ELLIS AND ELMER E. SHERMAN, OF PATOKA, ILLINOIS.

PISTON-ROD JOURNAL-BEARING.

1,347,687.  Specification of Letters Patent.  Patented July 27, 1920.

Application filed July 12, 1919. Serial No. 310,330.

*To all whom it may concern:*

Be it known that we, WILLIAM M. ELLIS and ELMER E. SHERMAN, citizens of the United States, residing at Patoka, Illinois, have invented a certain new and useful Improvement in Piston-Rod Journal-Bearings, of which the following is a full, clear, and exact description, such as will enable others skilled in the art to which it appertains to make and use the same, reference being had to the accompanying drawings, forming part of this specification.

Our invention relates generally to piston rods and more particularly to an automatic take-up for the journal bearings of piston rods, the principal object of our invention being to provide a relatively simple, inexpensive and efficient construction that will automatically take up any wear that may occur between the babbitt lining of the journal bearing and the shaft operating in said bearing.

To accomplish this automatic take-up of wear on the babbitt lining of the journal bearing, we propose to utilize wedge blocks which are constantly drawn to each other by a retractile spring and which wedge blocks are effective in maintaining the cap on the lower end of the piston rod in close engagement with the shaft that occupies the journal bearing.

With the foregoing and other objects in view, our invention consists in certain novel features of construction and arrangement of parts, hereinafter more fully described and claimed, and illustrated in the accompanying drawings, in which—

Figure 1 is an elevational view of a portion of a piston rod equipped with our improved automatic take-up, parts of said rod and the cap associated therewith being in section.

Fig. 2 is a view looking against the underside of the cap portion of the journal bearing.

Fig. 3 is a detail section taken approximately on the line 3—3 of Fig. 1.

Fig. 4 is a perspective view of one of the wedge blocks forming a part of our improved automatic take-up.

Referring by numerals to the accompanying drawings, 10 designates a piston rod of the type generally utilized in internal combustion engines, and formed on the lower end of said rod are oppositely disposed ears 11, the latter being provided with vertically disposed bolt holes. Formed in the underside of the piston rod between these ears is a semi-circular recess 12 that is provided with a lining 13 of babbitt or analogous material and which latter forms the upper half of the journal bearing.

A cap 14 is provided in its upper side with a centrally arranged babbitt lined recess 15, the latter coöperating with the babbitt lined recess 12 to form a journal bearing for the crank shaft 16. The end portions 17 of this cap are positioned immediately beneath the ears 11 and said portions 17 being provided with bolt holes which are in vertical alinement with the bolt holes in said ears. The under sides of the end portions 17 of the cap are provided with beveled or inclined faces 18 and positioned beneath said faces are wedge blocks 19 provided with beveled top faces 20 which bear directly against the beveled faces 18 on the underside of ears 17.

The wedge blocks 19 are provided with longitudinally disposed slots 21 which accommodate the lower portions of the bolts 22 that serve to secure the cap 14 to the lower end of the piston rod. The inner ends of the wedge blocks are provided with hooks 22' to which are secured the ends of a retractile spring 23, the same being normally under tension and tending to draw the wedge blocks toward each other. The lower ends of the bolts 22 are threaded in order to receive nuts 24, the latter being of the crown type in order that they may be locked to the bolts by means of cotter pins or the like.

It will be understood that in constructing a journal bearing of the type to which our invention relates the parts shown be formed so as to provide a slight space such as A between the ears 11 and the end portions 17 of cap 15, such space permitting the cap portion of the bearing to move toward the piston rod as wear occurs on the babbitt lining of said bearing.

When our improved bearing is properly assembled, the various parts thereof occupy the positions illustrated in Fig. 1 and the nuts 24 are tightened on the lower ends of the bolts and locked thereto by pins or in any suitable manner.

As wear occurs between the crank shaft and the babbitt lining of the journal, the tension of retractile spring 23 is exerted to draw the wedge blocks 19 toward each other with the result that the cap 15 will be constantly forced upwardly to maintain a relatively tight bearing against the crank shaft.

A journal bearing take-up of our improved construction can be easily and cheaply manufactured, is wholly automatic in action, and provides a simple and efficient means for taking up all wear and lost motion between a shaft and the journal bearing thereof.

It will be readily understood that minor changes in the size, form and construction of the various parts of our improved journal bearing can be made and substituted for those herein shown and described, without departing from the spirit of our invention the scope of which is set forth in the appended claims.

We claim:

1. The combination with a piston rod, of a cap, there being a journal bearing formed between said piston rod and cap, the undersides of the end portions of said cap being provided with inclined faces, wedge blocks bearing against said inclined faces, a retractile spring connected to said wedge blocks for drawing the same toward each other, a bolt passing through parts of the piston rod, said caps, and said wedge blocks, and a nut on the bolt and bearing against the wedge blocks.

2. The combination with a piston rod provided with oppositely arranged ears, of a cap, the end portions of which are arranged beneath the ears on the piston rod, there being a journal bearing formed between said cap and piston rod, slotted wedge blocks positioned beneath the ends of the cap, hooks on the inner ends of the wedge blocks, a retractile spring secured to said hooks and connecting the inner ends of said wedge blocks, and bolts passing through the ears of the piston rod, through the ends of the cap, and through the slotted wedge blocks.

In testimony whereof we hereunto affix our signatures this 5th day of July, 1919.

WILLIAM M. ELLIS.
ELMER E. SHERMAN.